US012567311B2

(12) United States Patent
Filipour

(10) Patent No.: US 12,567,311 B2
(45) Date of Patent: *Mar. 3, 2026

(54) SKILL-BASED PRIZE LEVELS FOR BONUS PRIZE AWARDS

(71) Applicant: IGT, Las Vegas, NV (US)

(72) Inventor: Cameron Filipour, Las Vegas, NV (US)

(73) Assignee: IGT, Las Vegas, NV (US)

( * ) Notice: Subject to any disclaimer, the term of this patent is extended or adjusted under 35 U.S.C. 154(b) by 266 days.

This patent is subject to a terminal disclaimer.

(21) Appl. No.: 18/240,517

(22) Filed: Aug. 31, 2023

(65) Prior Publication Data

US 2023/0410600 A1 Dec. 21, 2023

Related U.S. Application Data

(63) Continuation of application No. 17/859,626, filed on Jul. 7, 2022, now Pat. No. 11,810,427, which is a continuation of application No. 16/377,865, filed on Apr. 8, 2019, now Pat. No. 11,417,174.

(51) Int. Cl.
*G07F 17/32* (2006.01)

(52) U.S. Cl.
CPC ...... *G07F 17/3258* (2013.01); *G07F 17/3239* (2013.01); *G07F 17/3295* (2013.01)

(58) Field of Classification Search
None
See application file for complete search history.

(56) References Cited

U.S. PATENT DOCUMENTS 5,996,997 A * 12/1999 Kamille .................. A63F 3/065 463/17
9,717,986 B1 * 8/2017 Kawaguchi ........... A63F 13/822
10,482,713 B1 * 11/2019 Schultz ............... G07F 17/3267
10,864,439 B2 * 12/2020 Youda ..................... A63F 13/30
2002/0036381 A1 * 3/2002 Scibetta .............. G07F 17/3293 463/11
2002/0077174 A1 * 6/2002 Luciano .................. G07F 17/32 463/47
2002/0142832 A1 * 10/2002 Loose ................. G07F 17/3209 463/30
2002/0145255 A1 * 10/2002 Rudolph ................. G07F 17/32 273/292
2004/0209662 A1 * 10/2004 Wadleigh ............ G07F 17/3267 463/16
2005/0059459 A1 * 3/2005 Dunn .................. G07F 17/3262 463/16

(Continued)

*Primary Examiner* — Tramar Harper
(74) *Attorney, Agent, or Firm* — Sage Patent Group

(57) ABSTRACT

Systems, devices and methods are operable to include selecting a virtual prize container from a plurality of virtual prize containers that each correspond to one a plurality of prize levels in response to detecting a game event in a wagering game. The selected virtual prize container including information corresponding to the prize level and concealing a prize that is in the virtual prize container is awarded to the player. An input from the player that corresponds to the selected virtual prize container is received. In response to a player achievement level being at a minimum or higher level that corresponds to the prize level of the selected virtual prize container, the prize is awarded to the player.

16 Claims, 10 Drawing Sheets

(56) References Cited

U.S. PATENT DOCUMENTS

| | | | | |
|---|---|---|---|---|
| 2005/0079908 | A1* | 4/2005 | Pacey | G07F 17/32 463/20 |
| 2005/0219224 | A1* | 10/2005 | Liebenow | G06F 3/03545 345/173 |
| 2006/0121971 | A1* | 6/2006 | Slomiany | G07F 17/3295 463/16 |
| 2009/0124335 | A1* | 5/2009 | Watkins | G07F 17/32 463/31 |
| 2009/0143136 | A1* | 6/2009 | Thomas | G07F 17/32 463/43 |
| 2012/0122553 | A1* | 5/2012 | Bunch | G07F 17/3255 463/25 |
| 2013/0229386 | A1* | 9/2013 | Bathiche | G06F 3/0414 345/175 |
| 2014/0024429 | A1* | 1/2014 | Aoki | G06F 1/3287 463/20 |
| 2015/0031440 | A1* | 1/2015 | Desanti | A63F 13/822 463/25 |
| 2015/0302693 | A1* | 10/2015 | Mayeroff | G07F 17/3223 463/25 |
| 2015/0356829 | A1* | 12/2015 | Caputo | A63F 13/30 463/16 |
| 2018/0089960 | A1* | 3/2018 | Caputo | G07F 17/3209 |
| 2020/0111306 | A1* | 4/2020 | Oberberger | G07F 17/3211 |

* cited by examiner

SKILL-BASED PRIZE LEVELS FOR BONUS PRIZE AWARDS

CROSS REFERENCE TO RELATED APPLICATIONS

The present application is a continuation of U.S. patent application Ser. No. 17/859,626, filed Jul. 7, 2022, entitled, “SKILL-BASED PRIZE LEVELS FOR BONUS PRIZE AWARDS,” which is a continuation of U.S. patent application Ser. No. 16/377,865 filed Apr. 8, 2019, (now U.S. Pat. No. 11,417,174, issued Aug. 16, 2022,) entitled “SKILL-BASED PRIZE LEVELS FOR BONUS PRIZE AWARDS,” the disclosures and content of which are incorporated herein in their entirety.

BACKGROUND OF THE DISCLOSURE

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. The outcomes of such events are purely random or pseudo-random, and indeed, the requirement for randomness or pseudo-randomness of the outcomes is regulated in many jurisdictions.

Gambling on these systems may be contrasted with some other types of gambling, such as blackjack and poker, in which a player may increase their chance of winning a wager by playing the game with some level of skill relative to other players. Even in those games, however, a player cannot readily overcome the inherent randomness and odds of the game regardless of the player’s skill.

There are many EGMs that are competing for players. As such, EGM manufacturers are actively seeking different ways to attract players and to generate repeat play on specific games and/or games from specific manufacturers.

BRIEF SUMMARY OF THE DISCLOSURE

Some embodiments are directed to a gaming system that includes a processor circuit, a communication interface that is communicatively coupled to the processor circuit and that sends and receives data, and a memory coupled to the processor circuit. The memory includes machine readable instructions that, when executed by the processor circuit, cause the processor circuit to select a virtual prize container from a plurality of virtual prize containers that each correspond to one of a plurality of prize levels and award, to a player, the selected virtual prize container responsive to an occurrence of a game event satisfying an award rule, the selected virtual prize container comprising information defining the corresponding prize level and containing information that defines a prize that corresponds to the selected virtual prize container and that is unknown to the player. The processor circuit is further caused to receive an input from the player that corresponds to the selected virtual prize container and, responsive to receiving the input from the player and to a player achievement level being at a minimum or higher level that corresponds to the prize level of the selected virtual prize container, awarding the prize to the player by communicating information regarding the prize to the player.

Some embodiments are directed to a gaming device that includes a processor circuit and a memory that is coupled to the processor circuit. The memory includes machine readable instructions that, when executed by the processor circuit, cause the processor circuit to select a virtual prize container from a plurality of virtual prize containers that each correspond to one of a plurality of prize levels and award, to a player, the selected virtual prize container responsive to an occurrence of a game event satisfying an award rule, the selected virtual prize container comprising information defining the corresponding prize level and containing information that defines a prize that corresponds to the selected virtual prize container and that is unknown to the player. The processer circuit is further caused to receive an input from the player that corresponds to the selected virtual prize container and, responsive to receiving the input from the player and to a player achievement level being at a minimum or higher level that corresponds to the prize level of the selected virtual prize container, awarding the prize to the player by communicating information regarding the prize to the player.

Some embodiments of the inventive concept are directed to a computer implemented method that includes selecting, in response to detecting a game event in a wagering game, a virtual prize container from a plurality of virtual prize containers that each correspond to one a plurality of prize levels. Operations include selecting, in response to detecting a game event in a wagering game, a virtual prize container from a plurality of virtual prize containers that each correspond to one a plurality of prize levels, awarding, to a player, the selected virtual prize container comprising information corresponding to the prize level and concealing a prize that is in the selected virtual prize container and receiving an input from the player that corresponds to the selected virtual prize container. Operations may include, responsive to a player achievement level being at a minimum or higher level that corresponds to the prize level of the selected virtual prize container, awarding the prize to the player. The player may be a first player and, responsive to the selected virtual prize container being relinquished by the first player, operations may include sending a message that is receivable by a second player that offers the second player to redeem the selected virtual prize container that was relinquished by the first player.

DETAILED DESCRIPTION OF THE DISCLOSURE

Figure 1A:
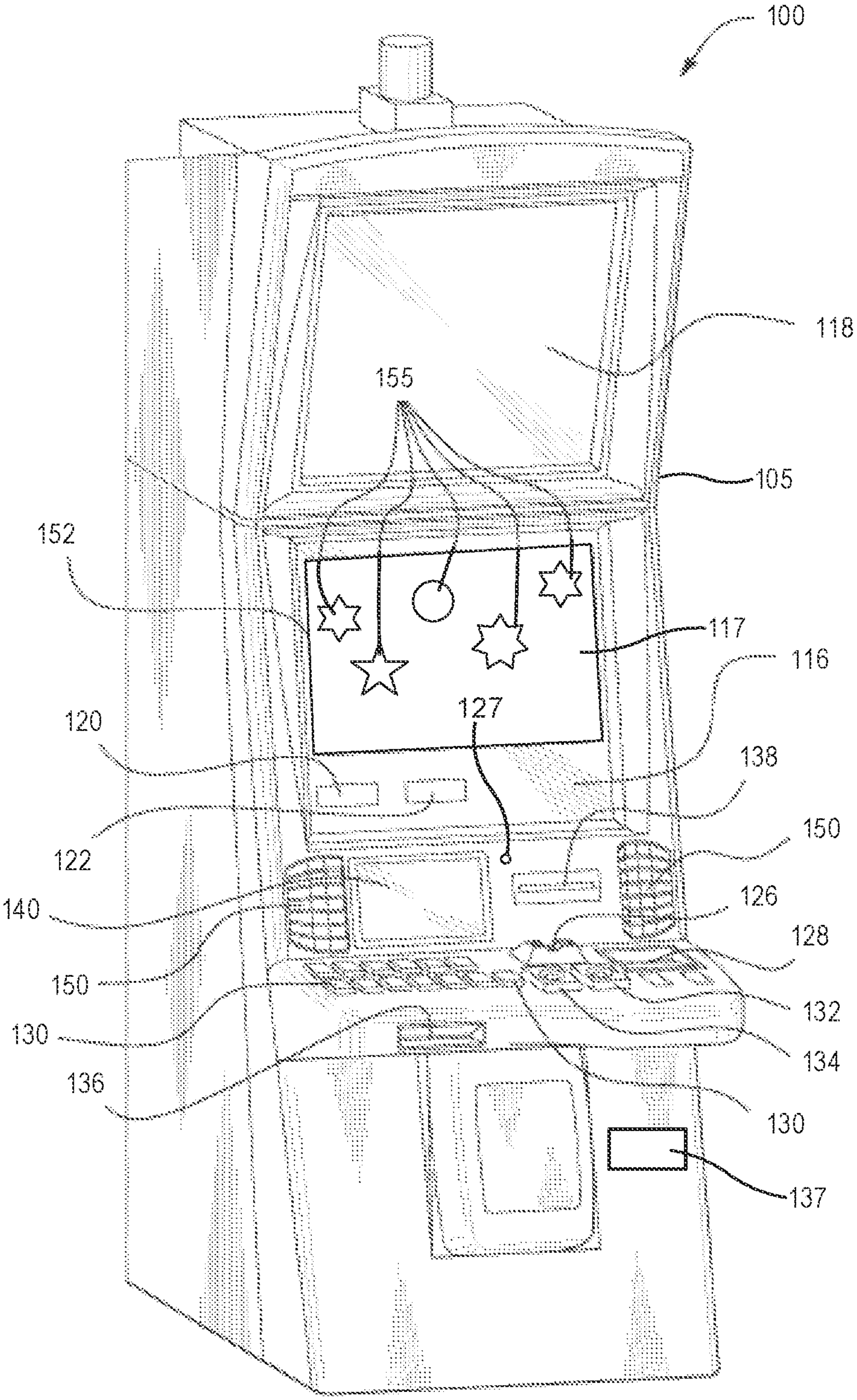
FIG. 1A is a perspective view of an electronic gaming device that can be configured according to some embodiments.

Embodiments of the inventive concepts provide virtual prize containers that may be awarded to players in wagering games that include a skill-based challenge. Different ones of the virtual prize containers may correspond to player achievement levels that correspond to skill-based performance. The value of prizes in virtual prize containers may correspond to the achievement levels of the containers. For example, a player with a sufficiently high achievement level may access prizes in a virtual prize container that is associated with the same or lower achievement level. Alternatively, a player with an achievement level that is less than that of a virtual prize container may not be able to access prizes in that virtual prize container. In this manner, players may be incentivized to improve their skill levels to gain access to better and better prizes. Systems and methods herein may provide a technical solution to the problem of reduced player enjoyment of a game over time by providing the opportunity to win prizes based, in part, on the skill level of the player and/or the player's achievement level in a skill challenge.

Provided herein is a skill-based enhancement that may be applied to a skill-based game or a non-skill-based game. The player of the game has an achievement level that is associated with him/her. As the player's achievement level advances, the player becomes eligible to win more and more valuable prizes as a reward for completing a skill challenge or event. Prizes may be awarded in locked virtual prize containers that may only be opened by a player having a sufficiently high achievement level.

Skill events may be presented to the player randomly and/or on the occurrence of predetermined game events. Skill events may include mental challenges, such as memory games and/or puzzles, dexterity challenges, head-to-head challenges and/or a combination thereof. The player may collect in-game prizes responsive to successful completion of skill events. When awarded, the prize may be hidden in a virtual prize container. In some embodiments, the virtual prize container may be a prize container icon that hides the prize identity and that indicates the achievement level that is associated with that container.

Upon completion of a skill event, a virtual prize container is randomly selected from among different virtual prize containers that correspond to different achievement levels. The virtual prize container contains a prize that may be randomly selected from multiple different prizes that correspond to the achievement level of the selected virtual prize container. A player may be awarded a virtual prize container that may correspond to any of the achievement levels. However, the player may only open the container if the player has an achievement level that is the same or higher than that of the virtual prize container. For example, a player may not be able to open a virtual prize container that corresponds to an achievement level that the player has not achieved.

Some embodiments provide that there may be fewer container levels than there are player achievement levels. For example, some embodiments include three container levels corresponding to, for example, wood, silver and gold. In such embodiments, there may be more than three player achievement levels. For example, an embodiment may include player achievement levels 1 to 30. In some embodiments, players with player achievement levels 1-10 may be able to open the wood virtual prize container but not the silver or gold virtual prize containers. Players with player achievement levels 11-20 may be able to open the wood and silver virtual prize containers, but not the gold virtual prize container. Players with player achievement levels 21-30 may be able to open the wood, silver and gold virtual prize containers.

Each container level may be associated with a different range of prizes. For example, a low container level may be associated with low-level prizes, such as free spins. A middle container level may be associated with medium level prizes, such as small credit awards. A high container level may be associated with high-level prizes, such as a large credit award or entry into a progressive jackpot, among others. In some embodiments, a virtual prize container may be empty, regardless of the container level.

Some embodiments provide if a player does not have a player achievement level that is high enough to open a virtual prize container that has been received, the player may keep the virtual prize container until the player has achieved the requisite player achievement level. In some embodiments, the virtual prize container may have an expiration date, at which point the virtual prize container may be returned to a prize pool.

As an example, the skill event may be a first person shooter game in which the player earns a treasure chest every time he or she kills an opponent. In some embodiments, the first person shooter game may be triggered by the occurrence of a predetermined outcome of a non-skill-based game. For example, a particular combination of symbols and/or tiles on a payline or the outcome of a skill-based game may trigger the first person shooter game. In some embodiments, the virtual prize containers may be a Wood Chest, Iron Chest, Silver Chest, Gold Chest, Diamond Chest, or Enchanted Chest, among others.

In some embodiments, a massive life-changing super award may be possible in any class of virtual prize containers. This possibility may provide compelling advertising content for the game.

Some embodiments provide players can level up in the game via skill and loyalty. Continuing with the above example, players may start from Wood class and working their way up toward Enchanted class.

Players can win any chest type but can only redeem the prizes from chests that they are qualified to open. In some embodiments, virtual prize containers can contain small/medium real money wins, virtual currency wins, in-game items, and super awards. In some embodiments, the overall reward profile may be highly volatile and weighted towards winning a jackpot or virtual currency only. In some embodiments, if a player collects a chest he or she cannot open, he or she can hold it until he/she is eligible to open it.

In some embodiments, some or all of the virtual prize containers may have an expiration window. In such embodiments, prizes not claimed before the virtual prize container expires may be randomly assigned to another player who is eligible to open them. In some embodiments, the eligible player may receive a message telling him or her to report to the casino within a given timeframe to redeem the prize that is in a virtual prize container that was forfeited by another player.

In some embodiments, the player's achievement level may follow them from session to session or may be limited to a single gaming session. The player can advance achievement levels in any number of ways, including total time played, total money wagered, skill-based performance, or other metrics.

In this manner, loyalty to a game may be increased.

Electronic Gaming Machines

Figure 1B:
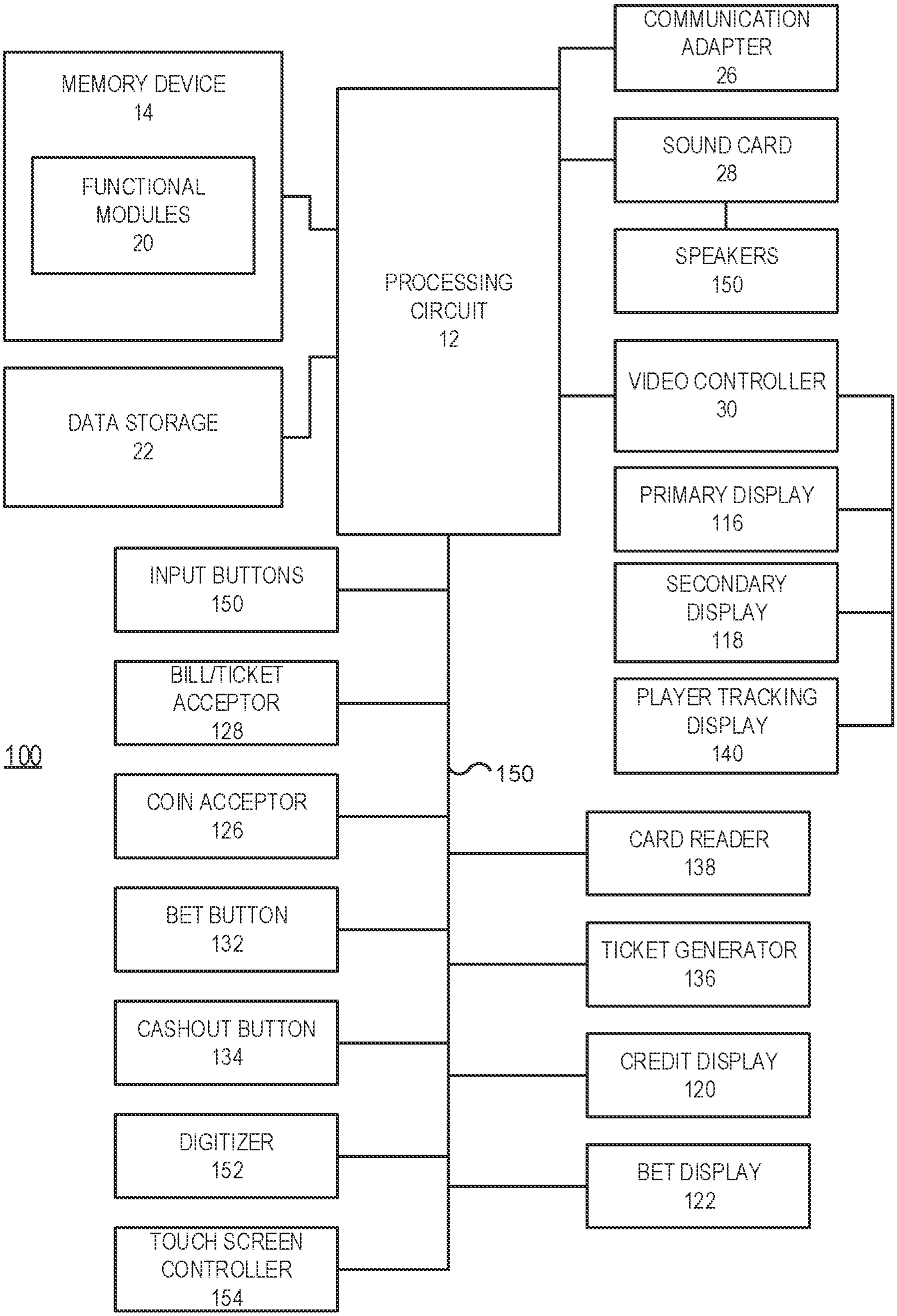
FIG. 1B is a schematic block diagram illustrating an electronic configuration for a gaming device according to some embodiments.
Figure 1C:
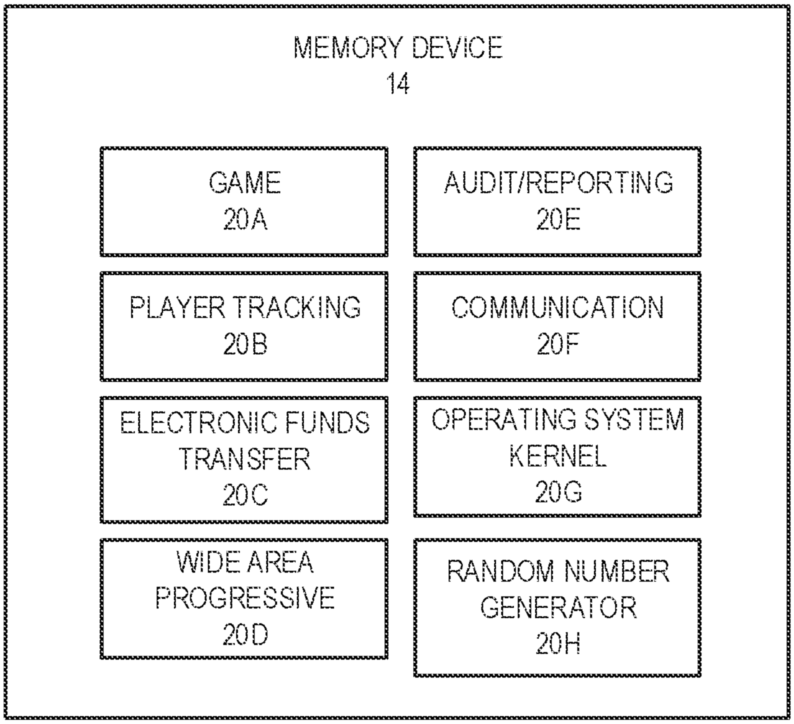
FIG. 1C is a block diagram that illustrates various functional modules of an electronic gaming device according to some embodiments.

An example of an electronic gaming machine (EGM) according to various embodiments is illustrated in FIGS. 1A, 1B, and 1C in which FIG. 1A is a perspective view of an EGM 100 illustrating various physical features of the device, FIG. 1B is a functional block diagram that schematically illustrates an electronic relationship of various elements of the EGM 100, and FIG. 1C illustrates various functional modules that can be stored in a memory device of the EGM 100. The embodiments shown in FIGS. 1A to 1C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 1A and 1B. For example, referring to FIG. 1A, an EGM 100 may include a support structure, housing or cabinet 105 which provides support for a plurality of displays, inputs, outputs, controls and other features that enable a player to interact with the EGM 100.

The EGM 100 illustrated in FIG. 1A includes a number of display devices, including a primary display device 116 located in a central portion of the cabinet 105 and a secondary display device 118 located in an upper portion of the cabinet 105. A plurality of game components 155 are displayed on a display screen 117 of the primary display device 116. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the EGM 100.

The player tracking display 140 may be used to display a service window that allows the player to interact with, for example, their player loyalty account to obtain features, bonuses, comps, etc. In other embodiments, additional display screens may be provided beyond those illustrated in FIG. 1A. In some embodiments, one or more of the player tracking display 140, the credit display 120 and the bet display 122 may be displayed in one or more portions of one or more other displays that display other game related visual content. For example, one or more of the player tracking display 140, the credit display 120 and the bet display 122 may be displayed in a picture in a picture on one or more displays.

The EGM 100 may further include a number of input devices 130 that allow a player to provide various inputs to the EGM 100, either before, during or after a game has been played. For example, the EGM 100 may include input devices 130 that are a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 1A and 1B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices 130 of the EGM 100 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 1B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 1B, operation of the primary display device 116, the secondary display device 118 and the player tracking display 140 may be controlled by a video controller 30 that receives video data from a processing circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 1A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

As illustrated in FIG. 1A, the EGM 100 may also include a currency dispenser 137 that may include a note dispenser configured to dispense paper currency and/or a coin generator configured to dispense coins or tokens in a coin payout tray.

The EGM 100 may further include one or more speakers 150 controlled by one or more sound cards 28 (FIG. 1B). The EGM 100 illustrated in FIG. 1A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 1B is a block diagram that illustrates logical and functional relationships between various components of an EGM 100. As shown in FIG. 1B, the EGM 100 may include a processing circuit 12 that controls operations of the EGM 100. Although illustrated as a single processing circuit, multiple special purpose and/or general purpose processing circuits, processors and/or processor cores may be provided in the EGM 100. For example, the EGM 100 may include one or more of a video processor, a signal processor, a sound processor and/or a communication controller that performs one or more control functions within the EGM 100. The processing circuit 12 may be variously referred to as a "controller," "microcontroller," "microprocessor" or simply a "computer." The processing circuit may further include one or more application-specific integrated circuits (ASICs).

Various components of the EGM 100 are illustrated in FIG. 1B as being connected to the processing circuit 12. It will be appreciated that the components may be connected to the processing circuit 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 1C.

The memory device 14 may store program code and instructions, executable by the processing circuit 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 12.

In some embodiments, the EGM 100 may include a sensor, such as a camera in communication with the processing circuit 12 (and possibly controlled by the processing circuit 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processing circuit 12 may incorporate that image into the primary and/or secondary game as a game image, symbol or indicia.

Various functional modules of that may be stored in a memory device 14 of an EGM 100 are illustrated in FIG. 1C. Referring to FIG. 1C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back-end server or financial institution to transfer funds to and from an account associated with the player. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 comprises a personal device, such as a desktop computer, a laptop computer, a mobile device, a tablet computer or computing device, a personal digital assistant (PDA), or other portable computing devices. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 1D:
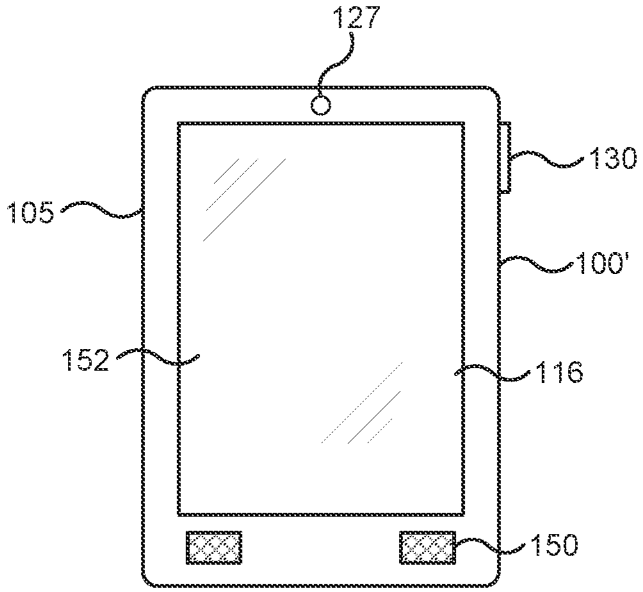
FIG. 1D is perspective view of a handheld electronic gaming device that can be configured according to some embodiments.

For example, referring to FIG. 1D, an EGM 100' may be implemented as a handheld device including a compact housing 105 on which is mounted a touchscreen of a primary display device 116 includes a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, gameplay activation button, etc., may be implemented as soft buttons on the touchscreen of the primary display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 1E:
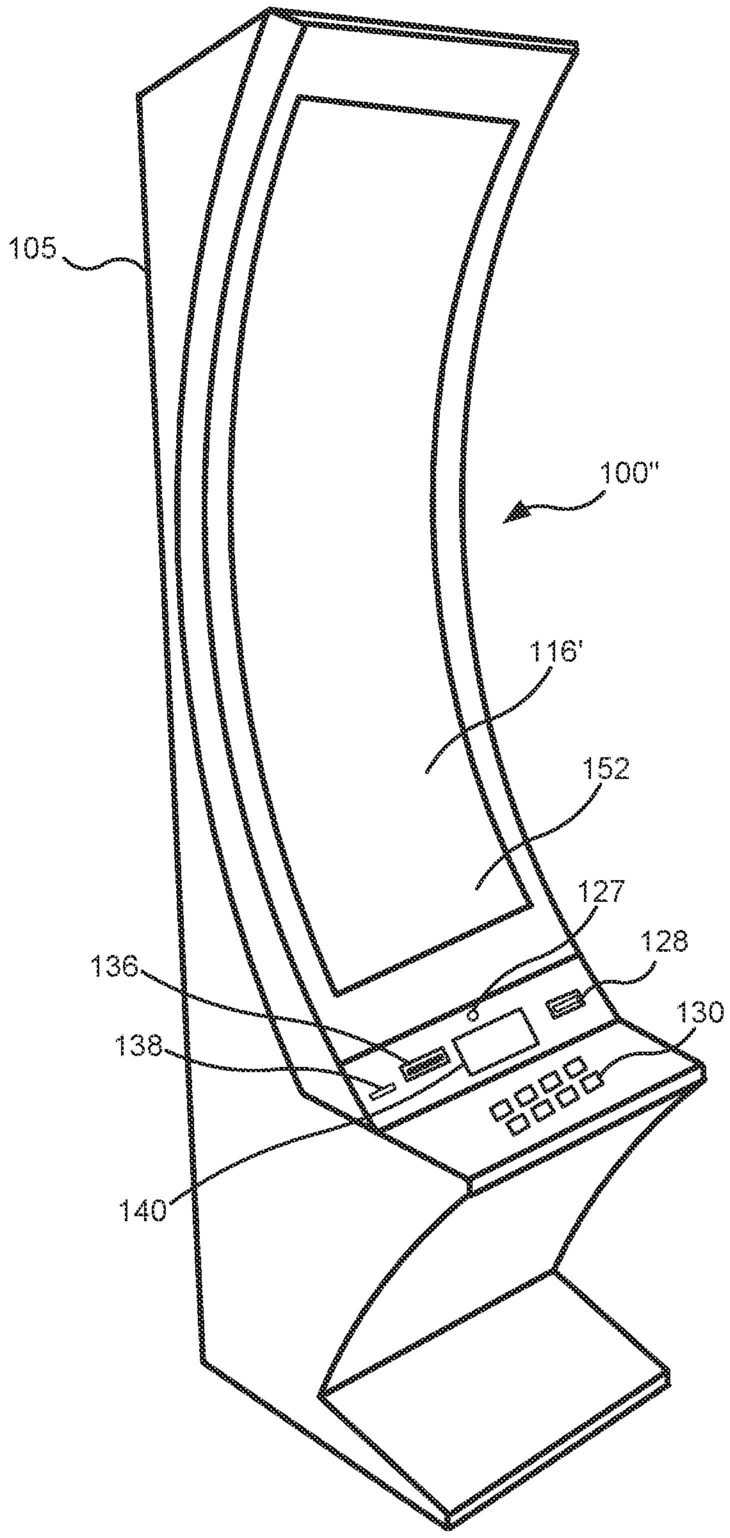
FIG. 1E is a perspective view of an electronic gaming device according to further embodiments.

FIG. 1E illustrates a standalone EGM 100" having a different form factor from the EGM 100 illustrated in FIG. 1A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Although illustrated as EGMs, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games.

EGM Network

Figure 2:
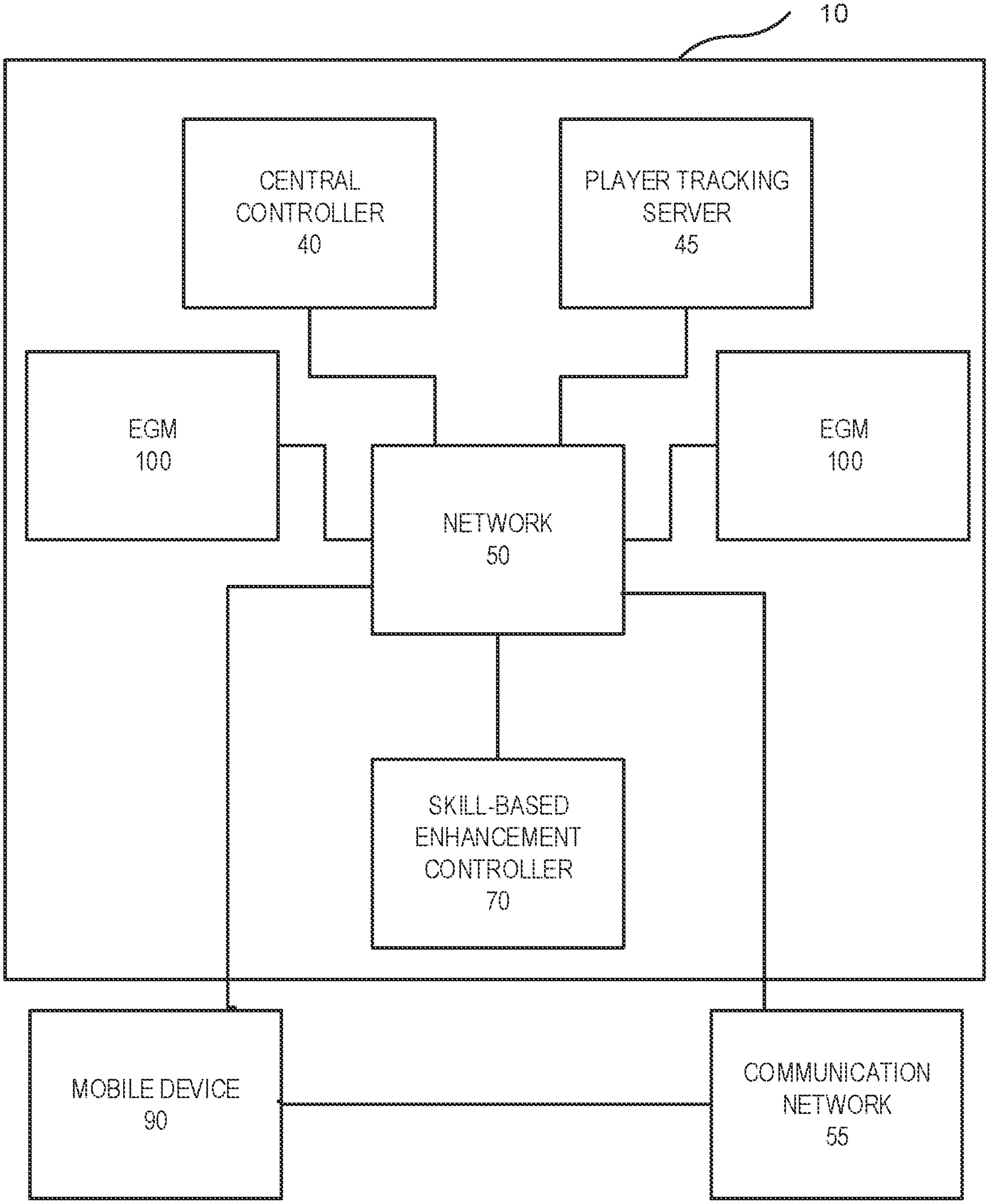
FIG. 2 is a schematic block diagram illustrating a network configuration for a plurality of gaming devices according to some embodiments.

Reference now made to FIG. 2, which is a schematic block diagram illustrating a network configuration for multiple gaming devices according to some embodiments. The network 10 includes one or more EGMs 100 that may be in communication with each other and/or at least one central controller 40 through a data network or remote communication link 50. The data network 50 may be a private data communication network that is operated, for example, by the gaming facility that operates the EGM 100. Communications over the data network 50 may be encrypted for security. The central controller 40 may be any suitable server or computing device which includes at least one processing circuit and at least one memory or storage device. In different such embodiments, the central controller 40 is a progressive controller or a processing circuit of one of the gaming devices in the gaming system. In these embodiments, the processing circuit of each gaming device is designed to transmit and receive events, messages, commands or any other suitable data or signal between the individual gaming device and the central server. The gaming device processing circuit is operable to execute such communicated events, messages or commands in conjunction with the operation of the gaming device. Moreover, the processing circuit of the central controller 40 is designed to transmit and receive events, messages, commands or any other suitable data or signal between the central controller 40 and each of the individual EGMs 100. The central controller 40 is operable to execute such communicated events, messages or commands in conjunction with the operation of the central server. It should be appreciated that one, more or each of the functions of the central controller 40 as disclosed herein may be performed by one or more EGM processing circuits. It should be further appreciated that one, more or each of the functions of one or more EGM processing circuits as disclosed herein may be performed by the central controller 40.

A player tracking server 45 may also be connected through the data network 50. The player tracking server 45 may manage a player tracking account that tracks the player's gameplay and spending, manages loyalty awards for the player, manages funds deposited or advanced on behalf of the player, and other functions. In some embodiments of the inventive concepts, the player tracking server 45 also keeps track of persistent enhancements that have been purchased or otherwise obtained by the player in connection with particular games.

A skill-based enhancement controller 70 may be connected through the data network 50. The skill-based enhancement controller 70 may determine player achievement levels, generate and/or select the virtual prize containers, award selected virtual prize containers, determine the prize in the selected virtual prize container and award the prize in the virtual prize containers when the player achievement level satisfies the prize level of the virtual achievement container.

In some embodiments, communications, including sending a message to another player's mobile device 90 that a prize that was relinquished by a first player is available to the second player. The communications may be performed using direct communications between the data network 50 and the mobile device 90 using wired and/or wireless communications components of the data network 50. A mobile device 90 may include any one of a smart phone, a tablet computer or computing device, a personal digital assistant (PDA), or other portable computing and/or telecommunications devices. Some embodiments provide that communications between the data network 50 and the mobile device 90 may be performed using one or more communication networks 55.

In some embodiments, the skill-based enhancement controller 70 may receive progress data from an EGM 100 corresponding to activities that may be used to determine the player's achievement level, the prize levels and/or the prizes. The progress data may include information regarding the player's progress in meeting one or more of the skill-based and/or non-skill-based challenges. Additionally, the skill-based enhancement controller 70 may provide the prize to the mobile device 90 for the player to use and/or redeem the prize on the mobile device 90. In some embodiments, the prize and/or virtual prize container has already been provided to the mobile device 90 in a concealed configuration and the skill-based enhancement controller 70 may provide a key, such as data, for opening the corresponding virtual prize container on the mobile device 90.

Figure 3:
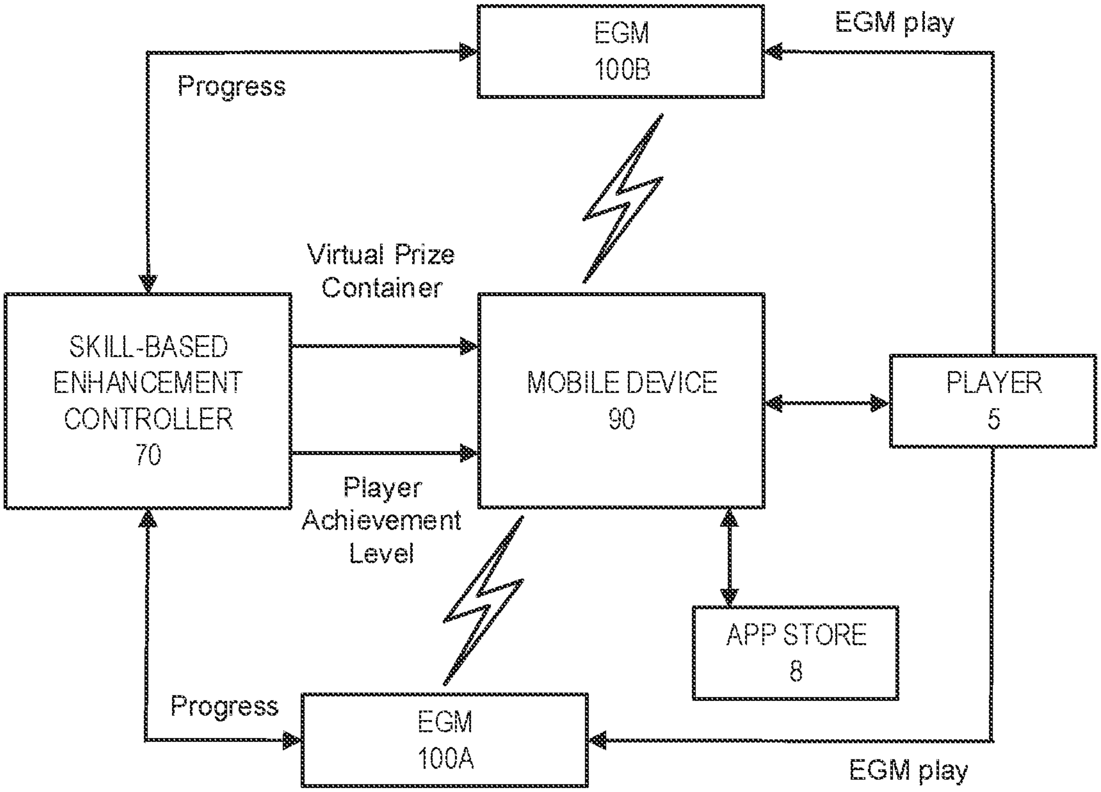
FIG. 3 is a schematic block diagram illustrating data flow for providing skill-based prize levels for bonus prize awards according to some embodiments.

Reference is now made to FIG. 3, which is a schematic block diagram illustrating data flow for providing skill-based prize levels for bonus prize awards according to some embodiments.

Some embodiments provide that a virtual prize container may be sent to the mobile device 90 of the player 5. The virtual prize container may include information corresponding to a prize level of the virtual prize container and/or graphical representation thereof. In some embodiments, the virtual prize container may be provided to the mobile device in a locked or partially functional state that may be unlocked and/or opened to reveal a prize that is concealed by the virtual prize container responsive to receiving progress data corresponding to the player achievement level.

In some embodiments, an EGM 100A, 100B may display a graphic that invites the player 5 to sign up to be eligible for virtual prize containers and corresponding prizes therein. For example, the mobile device 90 may connect with the EGM 100A, 100B via a wireless radio frequency communication link and/or may receive information optically by scanning a data code, such as a bar code or QR code, among others. In some embodiments, the mobile device 90 may receive information from the EGM 100A, 100B that directs the mobile device 90 to an application dispensary, such as an app store 8 or other online data repository. The mobile device may receive a bonus prize application that is executed on the mobile device 90 and that allows the mobile device 90 to register with the EGMs 100A, 100B to track the progress of the player 5 in achieving the player achievement levels for being able to open virtual prize containers to receive the prizes therein.

Figure 4A:
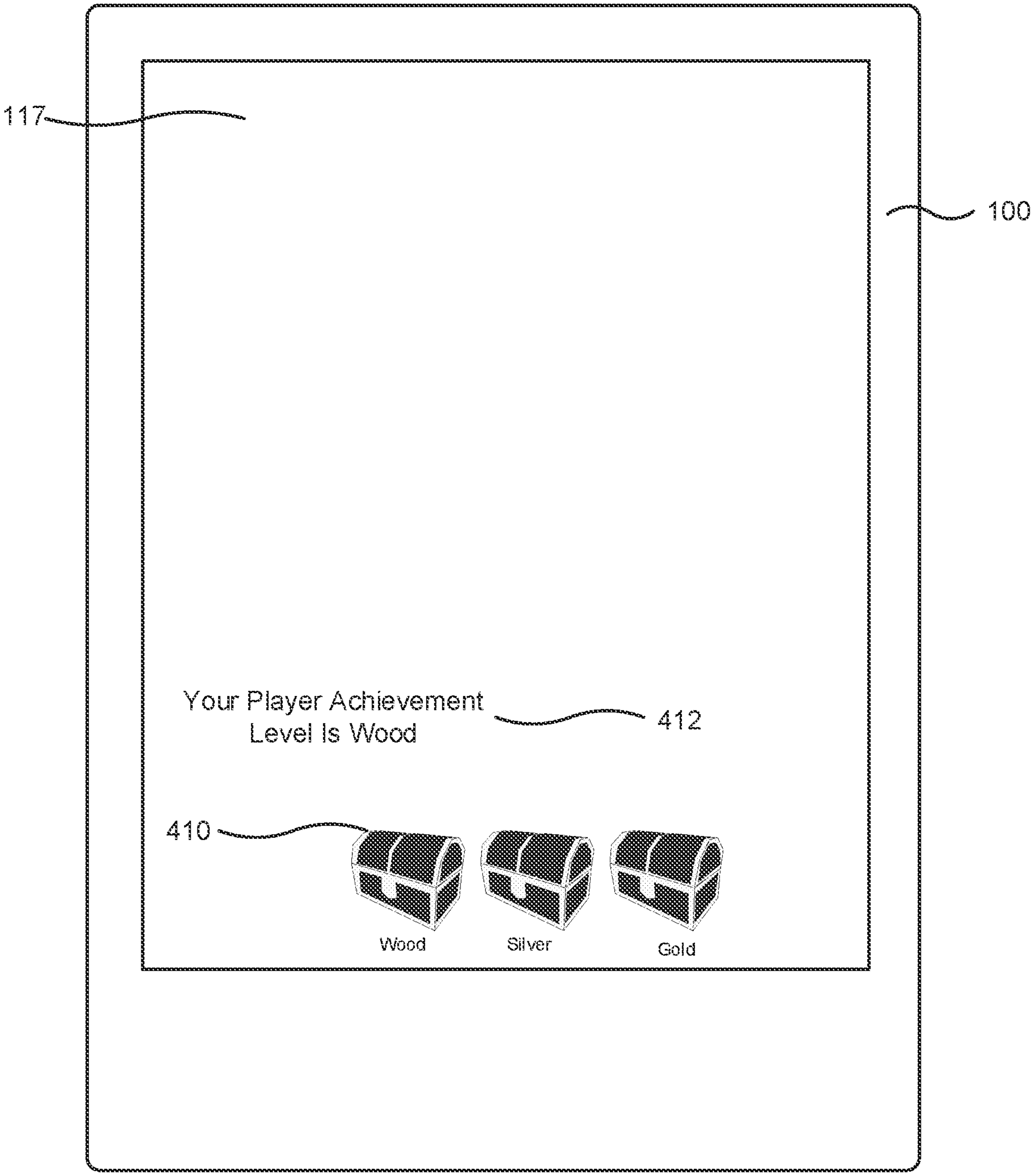
FIGS. 4A and 4B are each a partial schematic view of a display of a screen shot of virtual prize containers for a bonus prize according to some embodiments.

In some embodiments, the bonus prize application may include a digital incentive wallet that may manage the status of multiple virtual prize containers and player achievement levels. For example, brief reference is now made to FIGS. 4A and 4B, which are each a partial schematic view of a display of a screen shot of virtual prize containers for a bonus prize according to some embodiments. Referring to FIG. 4A, an EGM 100 may include a display 117 that displays the virtual prize containers as treasure chests 410. In some embodiments, the treasure chests 410 may include a designation or label that indicates the prize level corresponding to that treasure chest 410. For example, the prize level of a treasure chest 410 may be wood, silver or gold. The display 117 may include a text and/or graphical image that corresponds to the player achievement level 412.

In the current example, the player may have earned virtual containers corresponding to wood, silver and gold treasure chests 410. However, the player may have a player achievement level of wood. In this example, the player would only be eligible to open the wood treasure chest 410 and claim the prize that is in that virtual prize container. Since the player achievement level is below the prize levels of silver and gold, the player will have to earn a higher player achievement level to open the silver or gold treasure chests 410. Although this example provides that the player has received all three of the wood, silver and gold treasure chest 410, this is by example only. For example, a player may only have a single one of either the wood, silver or gold treasure chests 410. In such embodiments, the player may only be eligible to open the treasure chest 410 that corresponds to the player achievement level.

Figure 4B:
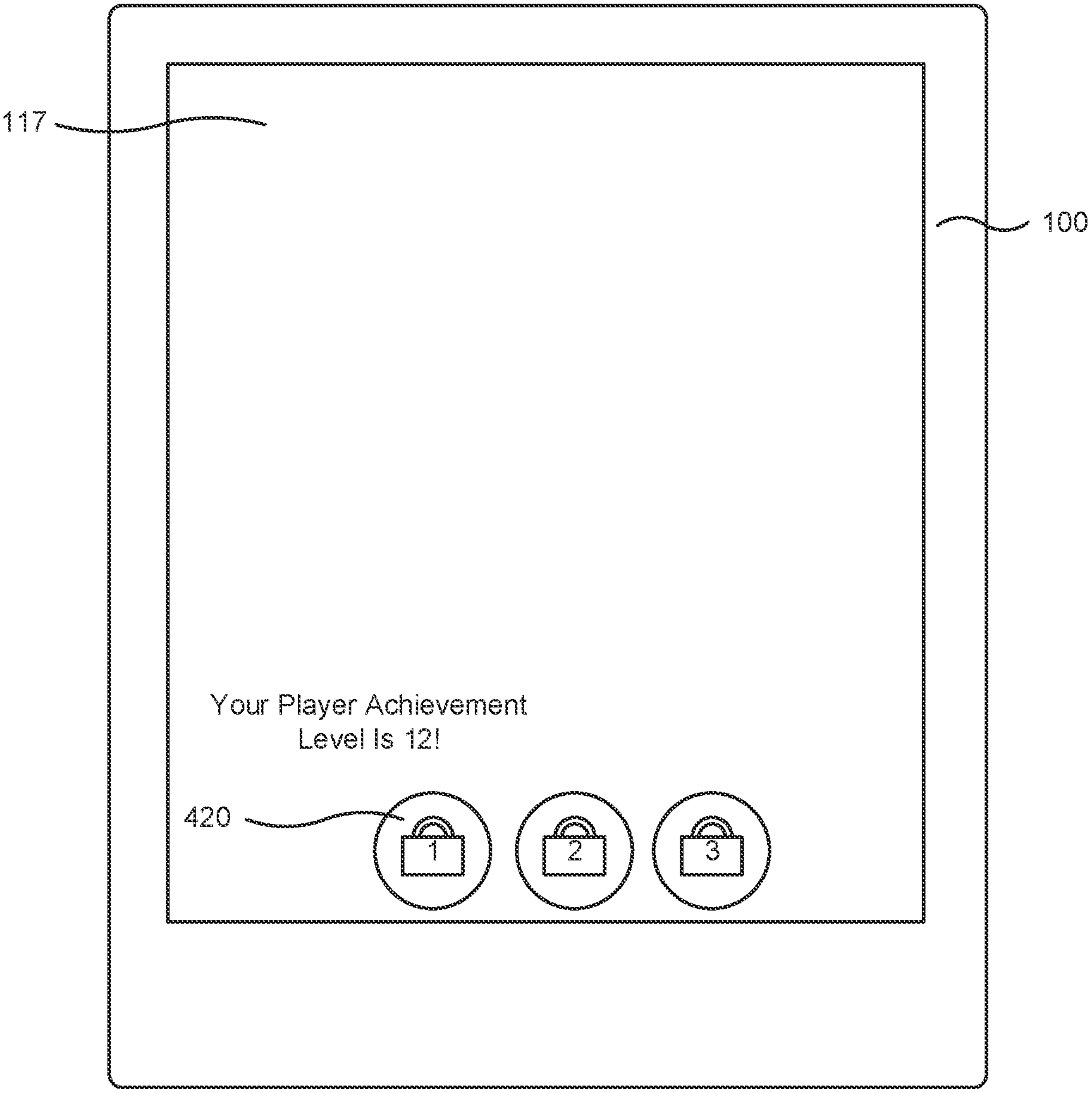

Referring to FIG. 4B, the virtual prize containers may be illustrated using icons other than treasure chests and may have prize levels that are expressed using alphabet and/or numerical designations. For example, virtual prize containers may be illustrated as locks 420 that have prize levels designated numerically. In some embodiments, the player achievement level may also be designated numerically. In some embodiments, the prize level corresponding to the lock 420 may correspond to a range of player achievement level values. For example, a prize level 1 lock may be opened by a player having a player achievement level in a range from 1 to 30. Similarly, a prize level 2 lock may be opened by a player having a player achievement level in a range from 11 to 30 and a prize level 3 lock may be opened by a player having a player achievement level in a range from 21-30.

Referring back to FIG. 3, once the mobile device 90 receives the virtual prize container and the player achievement level, the mobile device 90 may communicate with the EGMs 100A, 100B. Some embodiments provide that the skill-based enhancement controller 70 communicates the virtual prize container and the player achievement level directly to the EGM 100A, 100B without using the mobile device 90.

In some embodiments, the player 5 may achieve the player achievement level over multiple different gaming sessions. The player achievement level corresponding to a first gaming session may be maintained after the first session is completed. For example, the player 5 may commence a first gaming session on a first EGM 100A. Based on communication between the first EGM 100A and the mobile device 90 and/or the skill-based enhancement controller 70, the first EGM 100 may receive player achievement level data that corresponds to that player 5 from the incentive controller 70. During the first gaming session, data corresponding the player's progress in increasing the player achievement level may be tracked, updated and stored throughout the first gaming session. Once the first gaming session on the first EGM 100A is completed, the player achievement level data may be received by the skill-based enhancement controller 70 from the first EGM 100A.

The player 5 may commence a second gaming session of the first EGM 100A. Some embodiments provide the first EGM 100A refers to a first game title that may be presented in more than one physical game cabinet. Based on communication between the first EGM 100A and the mobile device 90, the first EGM 100A may receive player achievement level data that corresponds to that player 5 from the skill-based enhancement controller 70. During the second gaming session, data corresponding the player's progress in increasing the player achievement level may be tracked, updated and stored throughout the second gaming session. Once the second gaming session on the first EGM 100A is completed, the player achievement level data may be received by the skill-based enhancement controller 70 from the first EGM 100A. Additionally, during the first and/or second gaming sessions, the EGM 100A may display information corresponding to the player achievement level so the player 5 may be updated regarding progress towards being able to open virtual prize containers.

In embodiments in which the incentive objective includes activities corresponding to different EGMs 100, the second gaming session may be played on the second EGM 100B. In such embodiments, when the second gaming session commences on the second EGM 100B, the second EGM 100B may receive player achievement level data that corresponds to that player 5 from the skill-based enhancement controller 70. Similarly, once the second gaming session on the second EGM 100B is completed, the player achievement level data may be received by the skill-based enhancement controller 70 from the second EGM 100B.

Figure 5:
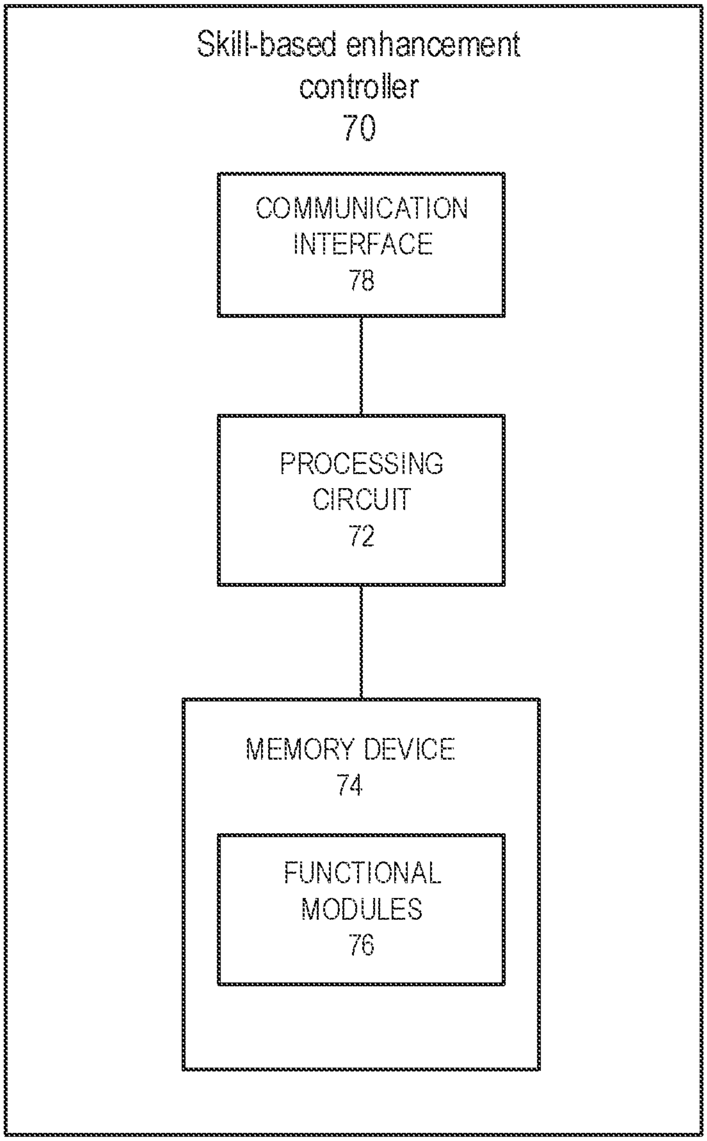
FIG. 5 is a schematic block diagram illustrating an electronic configuration for an skill-based enhancement controller according to some embodiments.

FIG. 5 is a schematic block diagram illustrating an electronic configuration for an skill-based enhancement controller according to some embodiments. As shown in FIG. 5, the skill-based enhancement controller 70 may include a processing circuit 72 that controls operations of the skill-based enhancement controller 70. Although illustrated as a single processing circuit, multiple special purpose and/or general purpose processing circuits, processors and/or processor cores may be provided in the skill-based enhancement controller 70. For example, the skill-based enhancement controller 70 may include one or more of a video processor, a signal processor, a sound processor and/or a communication controller that performs one or more control functions within the skill-based enhancement controller 70. The processing circuit 72 may be variously referred to as a "controller," "microcontroller," "microprocessor" or simply a "computer." The processing circuit 72 may further include one or more application-specific integrated circuits (ASICs).

Various components of the skill-based enhancement controller 70 are illustrated in FIG. 5 as being connected to the processing circuit 72. It will be appreciated that the components may be connected to the processing circuit 72 through a system bus, a communication bus and controller, such as a USB controller and USB bus, a network interface, or any other suitable type of connection.

The skill-based enhancement controller 70 further includes a memory device 74 that stores one or more functional modules 76 for performing the operations described herein.

The memory device 74 may store program code and instructions, executable by the processing circuit 72, to control the skill-based enhancement controller 70. The memory device 74 may include random access memory (RAM), which can include non-volatile RAM (NVRAM), magnetic RAM (MRAM), ferroelectric RAM (FeRAM) and other forms as commonly understood in the gaming industry. In some embodiments, the memory device 74 may include read only memory (ROM). In some embodiments, the memory device 74 may include flash memory and/or EEPROM (electrically erasable programmable read only memory). Any other suitable magnetic, optical and/or semiconductor memory may operate in conjunction with the gaming device disclosed herein.

The skill-based enhancement controller 70 may include a communication interface 78 that enables the incentive controller 70 to communicate with remote devices, such as EGMs 100, mobile devices 90 and/or a player tracking server 45 over a wired and/or wireless communication network, such as a local area network (LAN), wide area network (WAN), cellular communication network, and/or other data communication network.

The skill-based enhancement controller 70 may include one or more internal or external communication ports that enable the processing circuit 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processing circuit 72.

Figure 6:
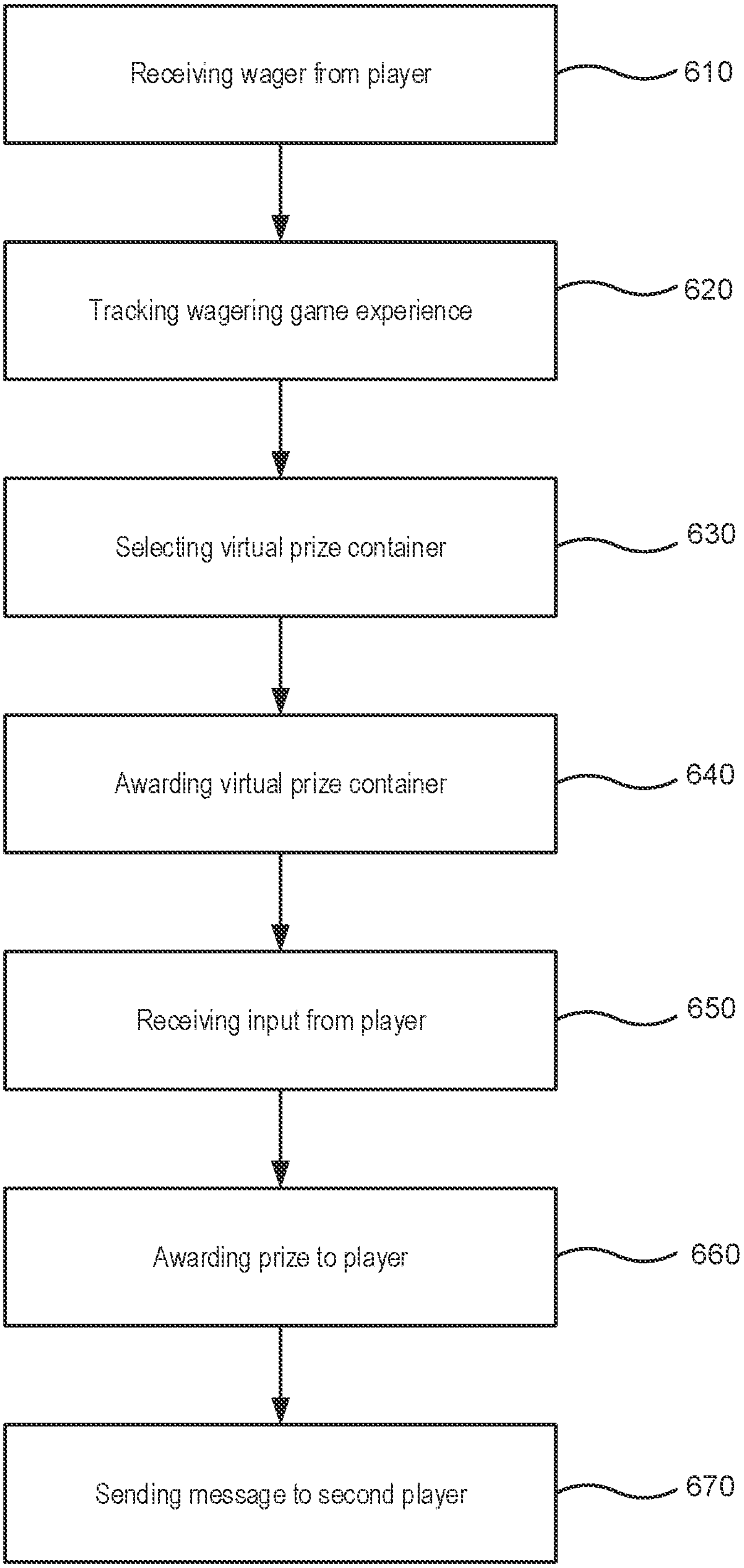
FIG. 6 is a flow diagram illustrating operations for devices, systems and/or methods according to some embodiments.

Reference is now made to FIG. 6, which is a flow diagram illustrating operations for devices, systems and/or methods according to some embodiments. Operations include a wager from a player (block 6100). In some embodiments, the wager that corresponds to a wagering game that includes a skill-based challenge. Operations may include tracking wagering game experience of a player to determine a player achievement level thereof (block 620). The player achievement level may be selected from multiple different player achievement levels and may be based on wagering game experience of the player.

Embodiments may include selecting a virtual prize container from multiple virtual prize containers (block 630). Each of the virtual prize containers may correspond to a different one of multiple different prize levels. Each of the prize levels may correspond to a different prize value. In some embodiments, the selection of the virtual prize containers is randomly determined.

Operations include awarding, to the player, the selected virtual prize container (block 640). In some embodiments the virtual prize container is awarded in response to an occurrence of a game event. Some embodiments provide that the selected virtual prize container includes information corresponding to the prize level and conceals information regarding a prize that is in the selected virtual prize container.

In some embodiments, the virtual prize containers include a first virtual prize container having a first prize level at a first prize value and a second virtual prize container having a second prize level at a second prize value that is greater than the first prize value. The player achievement levels include a first portion of player achievement levels and a second portion of player achievement levels that corresponds to a higher achievement than the first portion of player achievement levels. The first portion of player achievement levels permits the player to access the prize in the first virtual prize container and not the second virtual prize container. The second portion of player achievement levels permits the player to access the prize in the first virtual prize container or the second virtual prize container.

In some embodiments, awarding the selected virtual prize container to the player causes a container image to be displayed on a display device that is viewable by the player. In some embodiments, awarding the selected virtual prize container is performed responsive to an outcome of the skill-based challenge. Some embodiments provide that in response to the player achievement level being below a level for the player to access the selected virtual prize container, the virtual prize container is persistently available to the player until the player achievement level reaches the level for the player to access the selected virtual prize container and accesses the prize.

In some embodiments, the virtual prize container is available for a given time interval after the virtual prize container is awarded. Some embodiments provide that if the given time interval elapses, the virtual prize container is removed.

In some embodiments, in responsive to the player achievement level being below a level for the player to access the selected virtual prize container, the virtual prize container is persistent across multiple gaming sessions until the player can achieve a sufficiently high player achievement level to open the virtual prize container.

Embodiments may include receiving an input from the player that corresponds to the selected virtual prize container (block 650). In some embodiments, the input may include a request from the user to access the prize in the virtual prize container. In some embodiments, responsive to the player achievement level being a minimum or higher level that corresponds to the prize level of the selected virtual prize container, awarding the prize to the player (block 660).

Some embodiments include sending a message to a second player in response to the selected virtual prize container being relinquished by the first player (block 670). For example, the second player may have a sufficiently high player achievement level to open the virtual prize container. The message may invite the second player to come to the gaming property or casino to claim the virtual prize container. In some embodiments, the second player may be given a fixed time interval to get to the casino and to claim the virtual prize container.

In some embodiments, the virtual prize container comprises a virtual jackpot prize container that comprises a jackpot prize and the virtual jackpot prize container is randomly selected to be at any of the plurality of prize levels.

In some embodiments, different selected virtual prize containers are awarded in response to different game events. Some embodiments provide that the different selected virtual prize containers are maintained until the player achievement level of the player reaches the prize level corresponding to the selected virtual prize containers.

In some embodiments, the prize in the selected virtual prize container is determined randomly from a group of prizes that correspond to the prize level of the selected virtual prize container. In some embodiments, in response to the player achievement level being below a minimum value of the prize level, the player may request to exchange the selected virtual prize container for a virtual prize container that has a lower prize level. In such embodiments the selected virtual prize container may be exchanged for the prize container having the lower prize level.

Player Tracking

In various embodiments, the gaming system includes one or more player tracking systems under control of the player tracking module 20B shown in FIG. 1C. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player 5 is issued a player identification card that has an encoded player identification number that uniquely identifies the player 5. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display 140. In various embodiments, such tracked information and/or any suitable feature associated with the player tracking system is displayed via one or more service windows that are displayed on the central display device and/or the upper display device.

As noted above, a player's progress or status can be saved in other ways besides using a player tracking system, such as by generating, when the player 5 cashes out, a ticket including a printed code, such as a bar code or QR code, that identifies the player's session. When the player 5 wants to continue the game, the player 500 may insert the ticket including the printed code into the bill/ticket acceptor 128 of an EGM 100 (which may or may not be the same EGM 100 from which the ticket was issued). The EGM 100 reads the printed code and retrieves the player's status in response to the printed code.

Other EGM Features

Embodiments described herein may be implemented in various configurations for EGMs 100*s*, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processing circuit and memory devices. In such a "thick client" embodiment, the EGM local processing circuit executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processing circuit of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player 5 prior to enabling that player 5 to place any wagers on any plays of any wagering games. In one example, the central server, central controller, or remote host identifies the player 5 by requiring a player account of the player 5 to be logged into via an input of a unique username and password combination assigned to the player. It should be appreciated, however, that the central server, central controller, or remote host may identify the player 5 in any other suitable manner, such as by validating a player tracking identification number associated with the player; by reading a player tracking card or other smart card inserted into a card reader (as described below); by validating a unique player identification number associated with the player 5 by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved accessibility to wagering stations by including additional user interface technologies, such as augmented reality. Such embodiments may improve technological efficiency by coordinating the augmented reality with examples of different types of wagering stations.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A computer implemented method, comprising:

tracking wagering game experience of a player to determine a player achievement level of the player from a plurality of player achievement levels;

selecting, in response to detecting a game event in a wagering game, a virtual prize container from a plurality of virtual prize containers that each correspond to one of a plurality of prize levels;

awarding, to the player, the selected virtual prize container comprising information corresponding to a prize level and concealing a prize that is in the selected virtual prize container by causing an electronic gaming machine (EGM) to communicate information regarding the prize to the player via a display device of the EGM, the display device comprising a digitizer;

receiving an input from the player that corresponds to the selected virtual prize container;

responsive to the player achievement level being at a minimum or higher level that corresponds to the prize level of the selected virtual prize container, awarding the prize to the player, wherein the player comprises a first player, wherein responsive to the player achievement level being below a level for the player to access the prize, a skill-based enhancement controller is caused to maintain the virtual prize container to be persistently available to the player across multiple gaming sessions until the player achievement level reaches the level for the player to access the prize and accesses the prize; and responsive to expiration of a time interval after awarding the selected virtual prize container and before awarding the prize, unassigning the selected virtual prize container from the first player and sending a message that is receivable by a second player that invites the second player to redeem the unassigned virtual prize container.

2. The method of claim 1, wherein the plurality of virtual prize containers comprises a first virtual prize container comprising a first prize level at a first prize value and a second virtual prize container comprising a second prize level at a second prize value that is greater than the first prize value, wherein the plurality of player achievement levels comprises a first portion of player achievement levels and a second portion of player achievement levels that corresponds to higher achievement than the first portion of player achievement levels, and wherein, based on the first portion of player achievement levels, the skill-based enhancement controller is further caused to communicate information to the player by causing the EGM to present the information regarding the prize in the first virtual prize container and not the second virtual prize container.

3. The method of claim 1, wherein the plurality of virtual prize containers comprises a first virtual prize container comprising a first prize level at a first prize value and a second virtual prize container comprising a second prize level at a second prize value that is greater than the first prize value, wherein the plurality of player achievement levels comprises a first portion of player achievement levels and a second portion of player achievement levels that corresponds to higher achievement than the first portion of player achievement levels, and wherein, based on the second portion of player achievement levels, the skill-based enhancement controller is further caused to communicate information to the player by causing the EGM to present the information regarding the prize in the first virtual prize container and the second virtual prize container.

4. The method of claim 1, wherein which one of the plurality of virtual prize containers is selected is randomly determined, and wherein which prize corresponding to the selected virtual prize container is randomly selected.

5. The method of claim 1, wherein the skill-based enhancement controller is further caused to award the selected virtual prize container to the player by causing a container image to be displayed on a display device that is viewable by the player.

6. The method of claim 1, wherein the skill-based enhancement controller is further caused to award the selected virtual prize container in response to an outcome of a skill-based challenge.

7. The method of claim 1, wherein awarding the prize to the player is responsive to receiving an input from the player to open the selected virtual prize container.

8. The method of claim 1, wherein the virtual prize container comprises a virtual jackpot prize container that comprises a jackpot prize, and wherein the virtual jackpot prize container is randomly selected to be at any of the plurality of prize levels.

9. The method of claim 1, wherein the skill-based enhancement controller further awards a plurality of different selected virtual prize containers responsive to different game events satisfying an award rule, and wherein the skill-based enhancement controller is further caused to maintain ones of the plurality of different selected virtual prize containers until the skill-based enhancement controller awards ones of the selected virtual prize containers based on determining that the player achievement level of the player reaches a prize level corresponding to corresponding ones of the different selected virtual prize containers.

10. The method of claim 1, wherein the skill-based enhancement controller is further caused to randomly select a prize in the selected virtual prize container from a plurality of prizes that correspond to a prize level of the selected virtual prize container.

11. The method of claim 1, wherein responsive to receiving a message that the player has relinquished the selected virtual prize container, the skill-based enhancement controller further sends a message that is receivable by another player that is not currently playing, wherein the message invites the other player to redeem the selected virtual prize container that was relinquished by the player.

12. The method of claim 1, wherein responsive to the player achievement level being below a minimum value of the prize level, the skill-based enhancement controller receives, from the player, a request to exchange the selected virtual prize container for a virtual prize container comprising a prize level that is less than the prize level, and responsive to the receiving the request, causes the selected virtual prize container to be exchanged for the prize container comprising the lower prize level.

13. A computer implemented method comprising:

selecting a virtual prize container from a plurality of virtual prize containers that each correspond to one of a plurality of prize levels;

awarding, to a player, the selected virtual prize container responsive to an occurrence of a game event satisfying an award rule, the selected virtual prize container comprising information defining the corresponding prize level and containing information that defines a prize that corresponds to the selected virtual prize container;

receiving an input from the player that corresponds to the selected virtual prize container; and responsive to receiving the input from the player and to a player achievement level being at a minimum or higher level that corresponds to the prize level of the selected virtual prize container, awarding the prize to the player by communicating information regarding the prize to the player via a display device of an electronic gaming machine (EGM), the display device comprising a touchscreen controller, wherein responsive to the player achievement level being below a level for the player to access the prize, a processor circuit is further caused to maintain the virtual prize container to be persistently available to the player across multiple gaming sessions until the player achievement level reaches the level for the player to access the prize and accesses the prize.

14. The method of claim 13, wherein the plurality of virtual prize containers comprises a first virtual prize container comprising a first prize level at a first prize value and a second virtual prize container comprising a second prize level at a second prize value that is greater than the first prize value, wherein a plurality of player achievement levels comprises a first portion of player achievement levels and a second portion of player achievement levels that corresponds to higher achievement than the first portion of player achievement levels, and wherein, based on the first portion of player achievement levels, the processor circuit is further caused to communicate information to the player regarding the prize in the first virtual prize container and not the second virtual prize container.

15. The method of claim 13, wherein the plurality of virtual prize containers comprises a first virtual prize container comprising a first prize level at a first prize value and a second virtual prize container comprising a second prize level at a second prize value that is greater than the first prize value, wherein a plurality of player achievement levels comprises a first portion of player achievement levels and a second portion of player achievement levels that corresponds to higher achievement than the first portion of player achievement levels, and wherein, based on the second portion of player achievement levels, the processor circuit is further caused to communicate information to the player regarding the prize in the first virtual prize container and the second virtual prize container.

16. The method of claim 13, wherein the processor circuit is further caused to award the selected virtual prize container in response to an outcome of a skill-based challenge.

* * * * *